Feb. 18, 1941. O. D. McFARLAND ET AL Re. 21,718

TAKE-OFF MECHANISM

Original Filed Sept. 29, 1937 4 Sheets-Sheet 1

Inventors:
Owen D. McFarland
and Alfred O. Mickelson,
By Kenney & Kenney
Attorneys.

Feb. 18, 1941. O. D. McFARLAND ET AL Re. 21,718

TAKE-OFF MECHANISM

Original Filed Sept. 29, 1937 4 Sheets-Sheet 2

Inventors:
Owen D. McFarland
and Alfred O. Mickelson,
By Bunnell & Bunnell
Attorneys.

Feb. 18, 1941. O. D. McFARLAND ET AL Re. 21,718

TAKE-OFF MECHANISM

Original Filed Sept. 29, 1937 4 Sheets-Sheet 3

Inventors:
Owen D. McFarland
and Alfred O. Mickelson,
By Bunning & Bunning
Attorneys.

Feb. 18, 1941. O. D. McFARLAND ET AL Re. 21,718

TAKE-OFF MECHANISM

Original Filed Sept. 29, 1937 4 Sheets-Sheet 4

Inventors:
Owen D. McFarland
and Alfred O. Mickelson,
By Hamming & Hamming
Attorneys.

Reissued Feb. 18, 1941

Re. 21,718

UNITED STATES PATENT OFFICE 21,718

TAKE-OFF MECHANISM

Owen D. McFarland and Alfred O. Mickelson, Chicago, Ill., assignors to Roofing Machinery Mfg. Co., Chicago, Ill., a corporation of Illinois Original No. 2,148,379, dated February 21, 1939, Serial No. 166,431, September 29, 1937. Application for reissue October 25, 1940, Serial No. 362,841

17 Claims. (Cl. 164—84.5)

The present mechanism has been designed particularly to operate upon a traveling sheet of roofing material shortly after it has passed through a pair of cutting rollers, the purpose being to separate and remove the severed shingles, whether of single or multiple units, for distribution to a plurality of delivery stations. In the description to follow reference will be made to a machine which is illustrated in the accompanying drawings as a suggestive embodiment of our invention.

In the manufacture of roofing shingles, it is important that means be provided for severing the shingles from a slitted sheet, and for removing the shingles as severed to a plurality of stations preliminary to bundling. For doing this a take-off mechanism is employed. It should be so constructed as to be adaptable to existing roofing machines so as to operate in conjunction therewith; and it should be speedy and certain in its operation so that the speed of travel of the roofing material through the machine need not be retarded and so that the severed shingles which are taken off and deposited in different stacks will be piled evenly to facilitate tying and removal. These as well as various other objects and advantages are all realized by the mechanism of our invention of which a preferred embodiment is illustrated in the accompanying drawings in the manner following:

Figure 2:
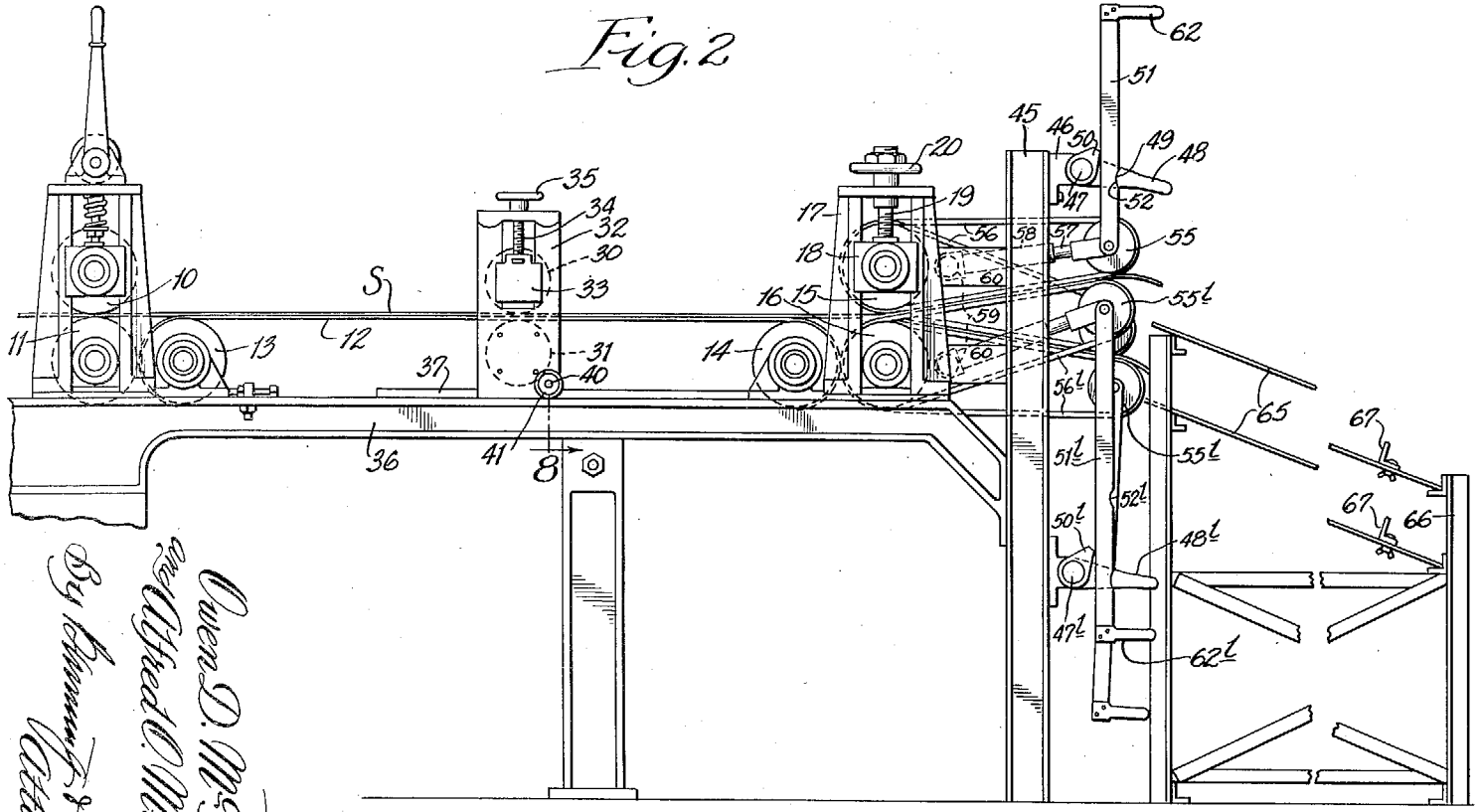
Fig. 2 is a side elevation thereof.
Figure 3:
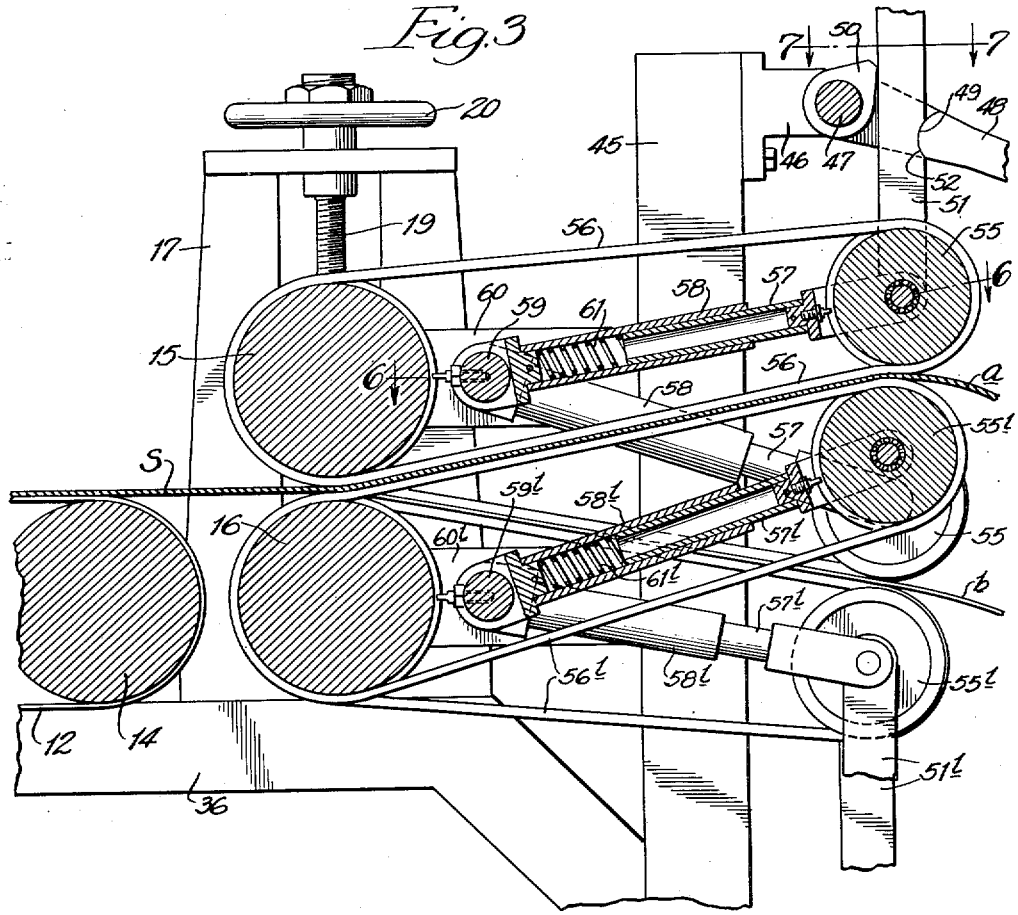
Fig. 3 is an enlarged detail in section taken on line 3—3 of Fig. 1.
Figure 6:
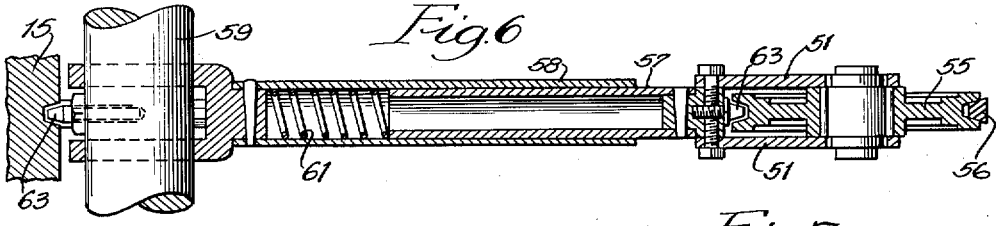
Figure 7:
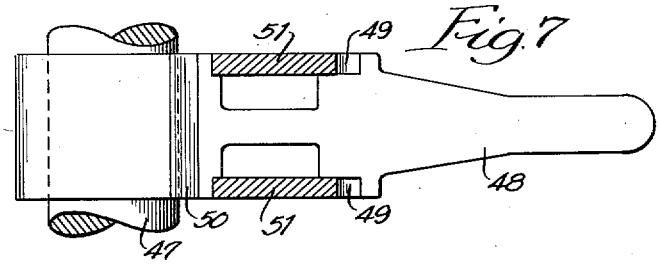
Figure 8:
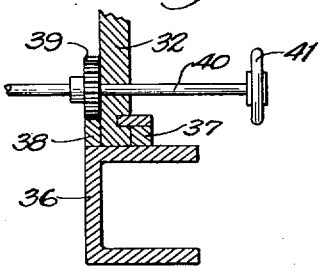

Figs. 6 and 7 are details in section taken, respectively, on lines 6—6 and 7—7 of Fig. 3;

Fig. 8 is a similar view taken on line 8 of Fig. 2; and

Figure 9:
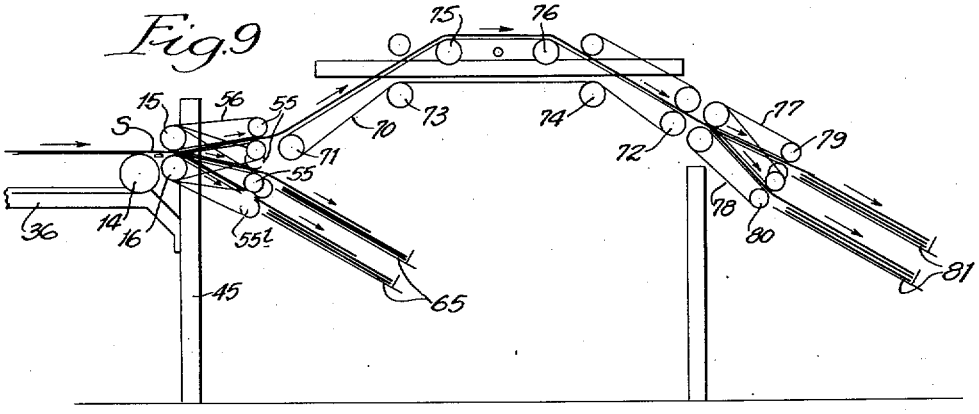

Fig. 9 is a diagrammatic view of a suggestive arrangement of four delivery stations in connection with the take-off mechanism.

Figure 4:
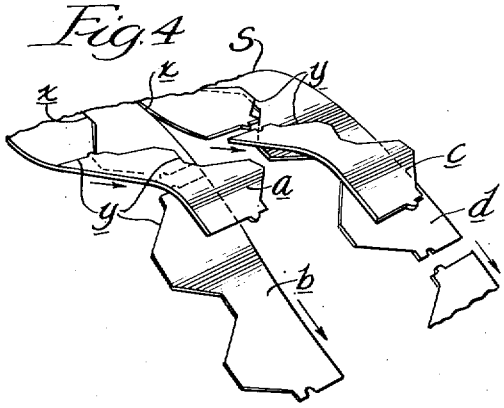
Fig. 4 is a fragmentary perspective view showing the shingles in process of being separated from the sheet during the take-off operation.
Figure 5:
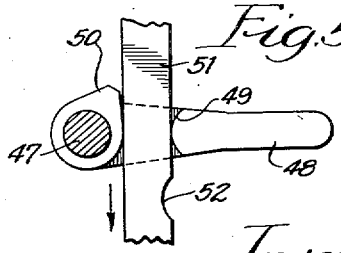
Fig. 5 is a detail of the lock for one of the vertically adjustable bars of the take-off mechanism.

With the details of manufacture of the roofing sheet this invention is not concerned; it operates merely in conjunction with the delivery end of such a machine which includes suitable slitting rolls (not shown) for severing the sheet S, except for slight connecting webs, into shingles *a*, *b*, *c*, *d* of single or multiple units (see Fig. 4) which are disposed in as many different lanes lengthwise of the sheet. After leaving the cutting rolls the sheet continues its advance to be acted upon by the several agencies now to be described.

Referring now to Fig. 2, the sheet first passes between upper and lower feeding rolls 10 and 11, respectively. Upon leaving these rolls the sheet advances on to a support which comprises a plurality of endless conveyor belts 12 which travel around rolls 13 and 14. The former of these rolls is positioned proximate to the feeding rolls so as to support the sheet immediately upon its emerging therebetween. The other roll 14, however, is located a desired distance away therefrom, preferably close to a pair of adjustable pulling rolls 15 and 16 between which the sheet is advanced. The pulling rolls are journaled for rotation within a frame 17 which furnishes a guide for blocks 18 each forming a bearing for the upper roll. As by a screw-threaded shaft 19 operable with a hand wheel 20 the upper roll may be adjusted toward or from the lower roll whereby to exert a desired pressure upon the sheet which is passing therebetween.

Figure 1:
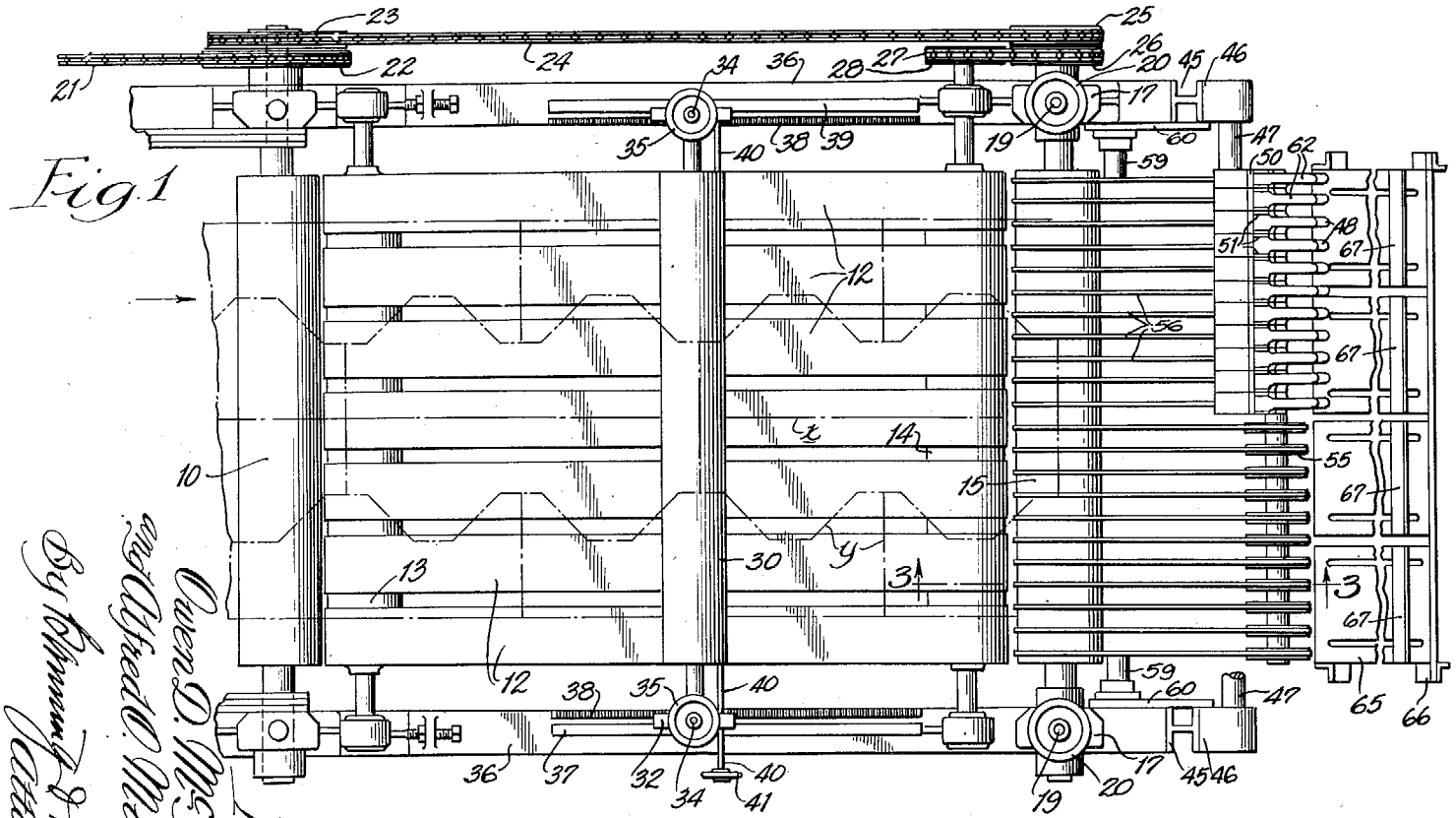
Figure 1 is a plan view of the delivery end of a roofing machine to which is operatively connected the take-off mechanism of our invention.

Driving connections between the several rolls just described may be provided as illustrated in Fig. 1. From a source of power (not shown) a transmission belt 21 is run over a pulley 22 on the shaft of the roll 11 whereby to produce rotation thereof. From a concentric pulley 23 a belt 24 is run over a smaller pulley 25 which is mounted on the shaft of the pulling roll 16 to transmit rotation thereto. Over a second pulley 26 concentric with the pulley 25 is trained a belt 27 which passes around a pulley 28 mounted on the shaft of the roll 14. By this system of transmission the belt 21 rotates both the feeding and pulling rolls, the latter, however, at a somewhat higher peripheral speed; the endless conveyor belts which train over the rolls 13 and 14 are also moved to support on their upper runs the sheet which is required to pass through the two sets of rolls just referred to.

At a point intermediate of the feeding and pulling rolls is positioned a pair of idler rolls 30 and 31. These rolls are mounted for rotation and adjustment, one with respect to the other, within a pair of supporting frames 32 which is itself adjustable lengthwise of the machine. As shown, the upper roll is journaled within bearings 33 adapted to be vertically adjusted as by means of a screw 34 and hand wheel 35 whereby to exert a variable pressure on the sheet at this point. The lower roll 31 underlies the upper run of the endless belts so that pressure exerted by the upper roll is directed against the sheet while supported upon the belts. The frames 32 which mount the idler rolls are slidingly rested at each end upon a side rail 36 of the machine bed (see Fig. 8), being guided between spaced bars 37 and 38, the latter of which is formed with rack teeth with which meshes a pinion 39 upon a cross shaft 40 having an operating hand wheel 41. The position of the cooperating idler rolls may accordingly be shifted toward or from either of the other pair of rolls previously described.

Upon leaving the feeding rolls the slitted sheet is tensioned by reason of the greater peripheral speed of rotation of the pulling rolls. In consequence, the sheet tends to separate into individual shingles *a*, *b*, *c* and *d* (see Fig. 4) along its preslitted lines, designated as *x* (longitudinal) and *y* (transverse). From and after this moment the individual shingles, either completely or partly separated, are advanced processionally through diverging paths to a plurality of delivery stations. During this stage of their travel separation of the shingles from each other is completed. The mechanism for attending to these operations will now be described.

At the delivery end of the machine are positioned spaced upright frame members 45 each mounting an upper bracket 46 between which is supported a cross shaft 47 to which are pivoted in side by side relation a plurality of handle-levers 48 each having spaced pairs of spaced shoulders 49 and 50. Proximate to these shoulders are opposite faces of a pair of vertically adjustable bars 51 each having in one face a shallow notch 52 wherein the shoulder 49 may engage to lock the two bars in a definite operative position. Between the lower end of each pair of bars is rotatively supported a grooved sheave 55 around which runs an endless narrow pulling and delivery belt 56 which rides within one of the grooves of one of the upper pulling rolls 15. Each belt is maintained taut by an extensible strut which, as shown, comprises two telescoping tubes 57 and 58, one yoked for pivotal connection with a pair of bars 51 and the other for a like connection with a shaft 59 which is supported fixedly between two brackets 60 extending from the frame 17, a compression spring 61 exerting opposite thrusts against the two tubes whereby to maintain the strut in an extended condition such that the belt remains taut. Each pair of bars 51 may be equipped with a lifting handle 62, as shown. To keep the grooves of the sheaves and feeding rolls clear of grit and foreign matter, we provide small blades 63 one extending within each such groove, as shown best in Fig. 6.

For each pulling and delivery belt assembly just described, viz. the vertically adjustable bars and supported sheave together with extensible strut, we provide a duplicate assembly in a lower position which is proximate thereto. Inasmuch as the parts of this lower pulling and delivery belt assembly are the same, we have designated them by like reference numerals with an "*l*" added. The lower pulling and delivery belts train over the lower pulling roll 16 so that a shingle passing between these rolls is received between the lower rim of the upper belt and the upper run of the lower belt. The operative position of two associated pairs of bars 51 and $51^1$ (one above the other below) is such that their respective sheaves will almost touch (see Fig. 3) thereby maintaining pulling engagement between the opposed faces of the belts 56 and $56^1$ and the opposite faces of each shingle up to the point of emergence from the belts of these sheaves.

The bars with associated pulleys and belts should be sufficient in number and close enough in spacing to afford a travelling support, above and below, for the separated shingles which emerge from between the pulling rolls and belts. These belts are arranged in groups of perhaps five or six each, disposed side by side, each group adapted to receive the successive shingles *a*, *b*, *c*, or *d* which are severed from one of the four lanes longitudinally of the sheet. For example, if the sheet be slitted to produce four shingles transversely thereof (as herein illustrated), there will be four groups of belts provided, one for each set of shingles *a* and *d* adjacent opposite edges of the sheet, and one for each set of shingles *b* and *c* to the inside thereof. The sheaves for each group of belts are positioned at an elevation which is different from that of the others proximate thereto so as to cause the shingles supported between each group of belts to advance through a plane which is diverse to that of the travel of the next adjacent line of shingles. In this manner the separation of the shingles from the sheet (and each other) is positively assisted by what is, in effect, a shearing action.

The discharge end of each group of delivery belts lies opposite a board 65 which is loosely rested in inclined position upon a supporting rack 66. Each such board accordingly constitutes a delivery station for one set of shingles, *a*, *b*, *c* or *d* as the case may be. As the shingles are advanced successively beyond the ends of the delivery belts, they drop onto the inclined board of the proximate station and come to rest against an adjustable stop 67. A stack of shingles is thus built up which, when of a desired size, may be removed for bundling.

In some cases it may be desirable to locate some of the delivery stations at points other than side by side. A tandem arrangement which provides a working passageway between stations close to the machine and other stations further removed therefrom is indicated in Fig. 9. For such an arrangement we provide an endless transmission belt 70 extending between rolls 71 and 72 with other rolls 73 and 74 supporting the intermediate portion of the lower run of the belt at an elevated level, and still other rolls 75 and 76 doing the same for the upper run of the belt. Head room beneath this transmission belt is accordingly provided, permitting workmen to attend to the delivery stations proximate to the machine without interference. Each transmission belt carries connected shingles which are disposed in a selected lane of the sheet to a distant point where we may provide upper and lower delivery belts 77 and 78, respectively, with associated sheaves 79 and 80, respectively, for directing the shingles upon inclined boards 81.

In operation the present take-off mechanism will receive and distribute to various stations the shingles which are separated from the sheet. If necessary for access or other purposes, the vertical bars may be quickly and easily raised or lowered, as desired, the handle levers normally engaging therewith by gravity so as to lock these bars in their fixed operative positions.

The adjustable idler rolls may be shifted toward or from the feeding or pulling rolls, according as conditions require. If the condition of the severed sheet is such that pressure should be maintained thereon at a point closer to the pulling rolls than the feeding rolls, then the idler rolls may be shifted in that direction. The position which the idler rolls should occupy may be determined by conditions, the object being to assure of a complete and clean separation of shingles from the sheet and from each other.

We claim:

1. In a take-off mechanism for shingles severed from a sheet, the combination of a pair of grooved rolls through which the shingles are processionally advanced side by side, a plurality of upper and lower sheaves, adjustable swinging supports for the sheaves, upper and lower delivery belts extending around said rolls and sheaves adapted to receive between them, and engage opposite faces of, a succession of shingles, and an extensible strut with associated spring means in connection with each sheave for maintaining the supported belt taut.

2. In a take-off mechanism for shingles severed from a sheet, the combination of a pair of grooved rolls through which the shingles are processionally advanced side by side, a plurality of upper and lower sheaves, upper and lower delivery belts extending around said rolls and sheaves adapted to receive between them, and engage opposite faces of, a succession of shingles, an extensible strut with associated spring means in connection with each sheave to maintain the supported belt taut, and means for supporting each sheave comprising a pivoted locking lever and a bar slidingly supported by said lever.

3. In a take-off mechanism for singles severed from a sheet, the combination of a pair of grooved rolls through which the shingles are processionally advanced side by side, a plurality of upper and lower sheaves, upper and lower delivery belts extending around said rolls and sheaves adapted to receive between them, and engage opposite faces of, a succession of shingles, an extensible strut with associated spring means in connection with each sheave to maintain the supported belt taut, and means for supporting each sheave at a fixed vertical point without affecting the tautness of its supported belt.

4. In a take-off mechanism for shingles severed from a sheet, the combination of a pair of rolls through which the shingles are processionally advanced side by side, a plurality of upper and lower sheaves, adjustable swinging supports for the sheaves, upper and lower delivery belts extending around said rolls and sheaves adapted to receive between them, and engage opposite faces of, a succession of shingles, and an extensible strut with associated spring means in connection with each sheave for maintaining the supported belt taut, the several sheave supports being independently adjustable whereby to vary the vertical position of each sheave and, in consequence thereof, the distance of separation between each pair of delivery belts.

5. In a take-off mechanism for shingles severed from a sheet, the combination of a pair of rolls through which the shingles are processionally advanced side by side, a plurality of upper and lower sheaves, upper and lower delivery belts extending around said rolls and sheaves adapted to receive between them and engage opposite faces of, a succession of shingles, an extensible strut with associated spring means in connection with each sheave to maintain the supported belt taut, and means for supporting each sheave comprising a pivoted locking lever and a bar slidingly supported by said lever, the several sheave supporting means being independently adjustable whereby to vary the vertical position of each sheave and, in consequence thereof, the distance of separation between each pair of delivery belts.

6. In a take-off mechanism for shingles severed from a sheet, the combination of a pair of rolls through which the shingles are processionally advanced side by side, a plurality of upper and lower sheaves, upper and lower delivery belts extending around said rolls and sheaves adapted to receive between them, and engage opposite faces of, a succession of shingles, an extensible strut with associated spring means in connection with each sheave to maintain the supported belt taut, and means for supporting each sheave at a fixed vertical point without affecting the tautness of its supported belt, the several sheave supporting means being independently adjustable whereby to vary the vertical position of each sheave and, in consequence thereof, the distance of separation between each pair of delivery belts.

7. In a take-off mechanism for shingles severed from a sheet, the combination of a pair of rolls through which the shingles are precessionally advanced side by side and, adjacent thereto, a plurality of delivery belts arranged in pairs, one over the other, in such manner as to receive a succession of shingles between the lower run of the upper belt and the upper run of the lower belt for engagement thereby, a sheave for each belt at a point remote from the rolls, and vertically adjustable tension mounting for each sheave whereby to maintain its associated belt taut.

8. In a take-off mechanism for shingles severed from a sheet, the combination of a pair of rolls through which the shingles are precessionally advanced side by side and, adjacent thereto, a plurality of delivery belts arranged in pairs, one over the other, in such manner as to receive a succession of shingles between the lower run of the upper belt and the upper run of the lower belt for engagement thereby, a sheave for each belt at a point remote from the rolls, and a vertically adjustable tension mounting for each sheave whereby to maintain its associated belt taut, the several tension mountings being independently adjustable whereby to vary the vertical position of each sheave and, in consequence thereof, the distance of separation between each pair of delivery belts.

9. In a take-off mechanism for shingles severed from a sheet, the combination of a pair of rolls through which the shingles are processionally advanced side by side, means for adjusting the two rolls relatively toward and from each other whereby to vary the distance therebetween, a plurality of endless delivery belts arranged in pairs, one over the other, each being extended over one of the two rolls in such manner as to receive therefrom a succession of shingles between the lower run of the upper belt and the upper run of the lower belt for engagement thereby, a sheave for each belt at a point remote from the rolls, a tension mounting for each sheave whereby to maintain its associated belt taut, and means for securing each sheave independently in a selected position of adjustment in a vertical plane whereby to vary the clearance between the adjacent runs of each pair of delivery belts at the discharge end thereof and to change the inclination, either upwardly or downwardly, of the adjacent runs of each pair of delivery belts whereby to vary the elevational point of the discharge end thereof.

10. In a take-off mechanism for shingles severed from a sheet, the combination of a pair of rolls through which the shingles are processionally advanced side by side, means for adjusting the two rolls relatively toward and from each other whereby to vary the distance therebetween, a plurality of endless delivery belts arranged in pairs, one over the other, each being extended over one of the two rolls in such manner as to receive therefrom a succession of shingles between the lower run of the upper belt and the upper run of the lower belt for engagement thereby, a sheave for each belt at a point remote from the rolls, a pivoted strut affording a tension mounting for each sheave whereby to maintain its associated belt taut, and means for securing each sheave independently in a selected position of adjustment in a vertical plane whereby to vary the clearance between the adjacent runs of each pair of delivery belts at the discharge end thereof and to change the inclination, either upwardly or downwardly, of the adjacent runs of each pair of delivery belts whereby to vary the elevational point of the discharge end thereof.

11. In a take-off mechanism for shingles severed from a sheet, the combination of a pair of rolls through which the shingles are processionally advanced side by side and, adjacent thereto, a plurality of delivery belts arranged in pairs, one over the other, in such manner as to receive a succession of shingles between the lower run of the upper belt and the upper run of the lower belt for engagement thereby, a sheave for each belt at a point remote from the rolls, means for maintaining each belt taut, and releasable locking means for each sheave comprising two members interconnected for pivoted sliding movement adapted to support the sheave at a selected vertical point.

12. In a take-off mechanism for shingles severed from a sheet, the combination of a pair of rolls through which the shingles are processionally advanced side by side and, adjacent thereto, a plurality of delivery belts arranged in pairs, one over the other, in such manner as to receive a succession of shingles between the lower run of the upper belt and the upper run of the lower belt for engagement thereby, a sheave for each belt at a point remote from the rolls, a mounting for each sheave movable both vertically and toward and from its companion roll, means exerting a pressure toward the movable mounting in a direction away from its companion roll whereby to maintain the supported belt taut, and a releasable locking means for each sheave mounting adapted for the adjustable support thereof whereby to vary the vertical position of each sheave and, in consequence thereof, the distance of separation between each pair of delivery belts, the several pairs of delivery belts being divergingly adjustable, each independent of the others, in vertical planes.

13. The combination of a take-off mechanism for shingles which are severed from a slitted traveling sheet passing between two sets of opposed feeding and pulling rolls, of a belt traveling between two sets of rolls in supporting engagement with the sheets, co-acting idler rolls between the sets of feeding and pulling rolls arranged respectively above and below the sheet and supporting belt adapted to exert a compressive force thereupon, and an adjustable mounting for the co-acting idler rolls such that they may be shifted longitudinally of the sheet and its supporting belt toward or from either of the feeding or pulling rolls.

14. In a take-off mechanism for shingles severed from a sheet, the combination of a pair of cooperating pulling rolls through which the shingles are processionally advanced side by side, said rolls including a plurality of upper and lower sheaves with pulling and delivery belts extending around said rolls and sheaves, adapted to engage a succession of shingles between the opposed faces of the belts, vertically adjustably supporting means for each sheave whereby to position each supported belt independent, and divergingly in respect, of the remaining belts and, in consequence thereof, in a desired spacial relation to the other belt in the same pair, and means cooperating with the discharge end of each belt for the transfer of shingles therefrom to a desired station.

15. In a take-off mechanism for shingles severed from a sheet, the combination of a plurality of relatively wide endless conveyor belts having upper runs all in a common plane and, spaced therefrom but proximate to the discharge end thereof, a pair of rolls one above and the other below the line of advance of the upper run of the conveyor belts whereby shingles carried thereon, side by side, are adapted to be processionally transferred therefrom, spacially and without appreciably flexation, into the nip between the rolls, a plurality of upper and lower sheaves, relatively narrow upper and lower delivery belts extending around the upper and lower rolls and sheaves, respectively, adapted to receive between them, and engage opposite faces of, a succession of shingles, means for urging each sheave away from its companion roll whereby to maintain the supported belt taut, and a support for each sheave vertically adjustable independently of the remaining supports whereby to raise or lower the discharge end of each pair of delivery belts as well as to vary the distance of separation therebetween.

16. In a sheet feeding machine having a take-off mechanism, the combination of a plurality of side by side endless conveyor belts constituting one unit and, spaced therefrom but proximate to the discharge end thereof, a second unit comprising a pair of rolls one above and the other below the line of advance of the upper run of the conveyor belts whereby sheet material carried thereon is adapted to be transferred therefrom through space into the nip between the rolls, a plurality of upper and lower sheaves at points remote from the rolls, a plurality of pairs of upper and lower endless delivery belts extending in straight runs between the upper and lower rolls and sheaves and therearound, respectively, adapted to receive between them, engage opposite faces of, and advance in a straight line, sheet material received from the conveyor belts, means for urging each sheave away from its companion roll whereby to maintain the supported belt taut, means supporting each sheave independently of the remaining sheaves adjustably at a selected elevational point in a manner whereby to raise or lower the discharge end of each pair of delivery belts and to vary the distance of separation therebetween at such point, and means for adjusting the two rolls relatively toward and from each other whereby to vary the distance of separation between each pair of delivery belts at a point opposite the discharge ends thereof to accommodate and advance therebetween sheet material of a given thickness, the advance of the sheet material from beginning to end being in a straight line except at the point of transfer from the first to the second unit of the machine.

17. In a take-off mechanism for loose separated shingles adapted to be advanced processionally, side by side, through cooperating pulling rolls, a delivery mechanism for the shingles including a plurality of upper and lower sheaves with pulling and delivery belts extending around the sheaves and pulling rolls adapted to engage and support a succession of the loss shingles between opposed faces of the belts, means supporting certain pairs of the belts and sheaves in divergent relations to other pairs of the belts and sheaves, and means cooperating with the discharge end of each belt for the transfer of shingles therefrom to a desired station.

OWEN D. McFARLAND.
ALFRED O. MICKELSON.